(12) United States Patent
Gretz

(10) Patent No.: US 7,388,162 B1
(45) Date of Patent: Jun. 17, 2008

(54) ELECTRICAL BOX AND ADAPTER ASSEMBLY FOR BRICK WALL INSTALLATION

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/589,008

(22) Filed: Oct. 27, 2006

(51) Int. Cl.
*H02B 1/40* (2006.01)

(52) U.S. Cl. .................. 174/480; 174/481; 174/58; 174/53; 220/3.2; 220/3.3; 248/906

(58) Field of Classification Search .......... 174/480, 174/481, 50, 53, 57, 58, 17 R; 220/3.2–3.9, 220/4.02; 248/906; 439/535, 536
See application file for complete search history.

(56) References Cited

U.S. PATENT DOCUMENTS

| | | | |
|---|---|---|---|
| 2,736,450 A | 2/1956 | Atkinson | |
| 4,634,015 A * | 1/1987 | Taylor | ............... 220/3.7 |
| 4,693,438 A | 9/1987 | Angell | |
| 5,042,673 A | 8/1991 | McShane | |
| 5,975,323 A * | 11/1999 | Turan | ............... 220/3.7 |
| 6,278,058 B1 | 8/2001 | Anderson | |
| 6,737,576 B1 * | 5/2004 | Dinh | ............... 174/50 |
| 6,753,471 B2 | 6/2004 | Johnson et al. | |
| 6,956,169 B1 * | 10/2005 | Shotey et al. | ............... 174/58 |
| 7,038,131 B1 * | 5/2006 | Gretz | ............... 174/58 |
| 7,151,219 B1 * | 12/2006 | Gretz | ............... 174/58 |

* cited by examiner

*Primary Examiner*—Angel R Estrada

(57) ABSTRACT

An electrical box assembly for providing electrical service on a brick wall. The assembly includes an electrical outlet box and an adapter. The adapter includes sidewalls defining an internal cavity, an open front, an open rear, and arcuate cable holders for temporarily holding electrical cables until they are routed into the outlet box. Outward extending tabs are provided on the sidewalls of the adapter for enabling secure anchoring of the adapter into a hole in a brick wall. The outlet box includes sidewalls, a hinged cover, and bosses for accepting an electrical device. A fastening arrangement is provided for securing the outlet box to the adapter. Electrical service is provided by mortaring the adapter into a hole in the wall, sliding the outlet box slid into the cavity of the adapter, and securing the outlet box to the adapter with the fastening arrangement.

18 Claims, 11 Drawing Sheets

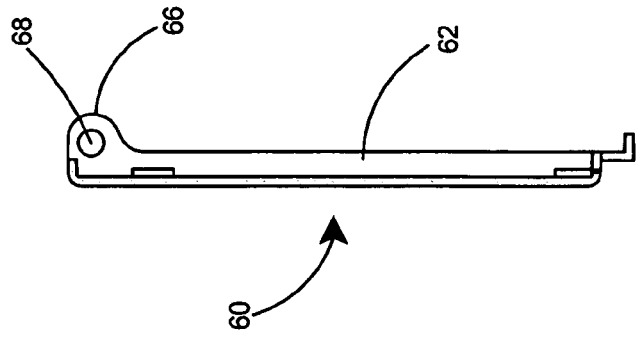
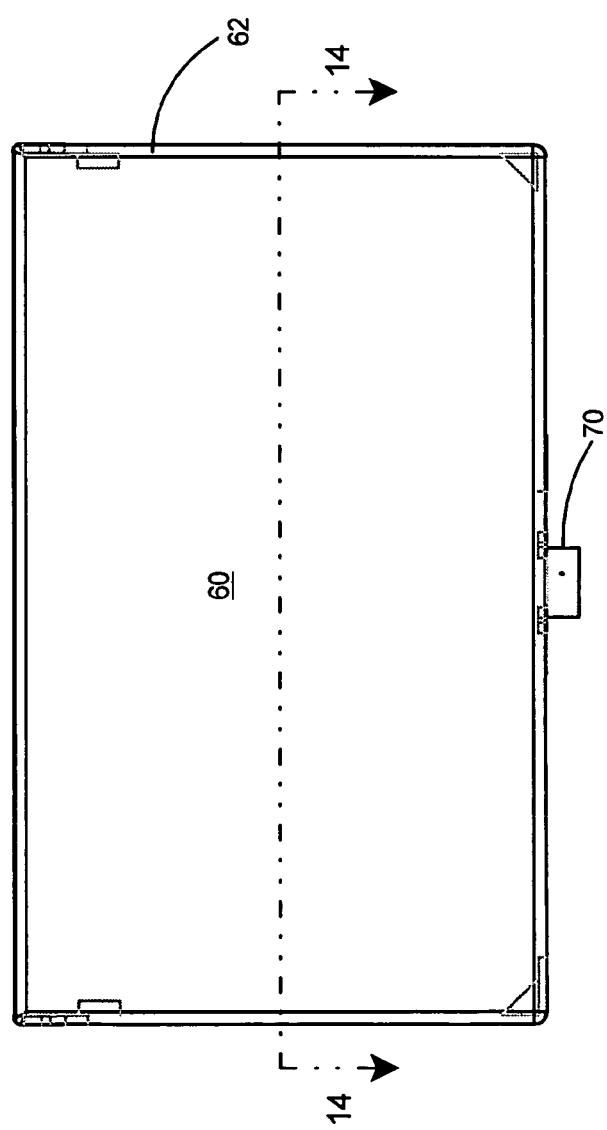
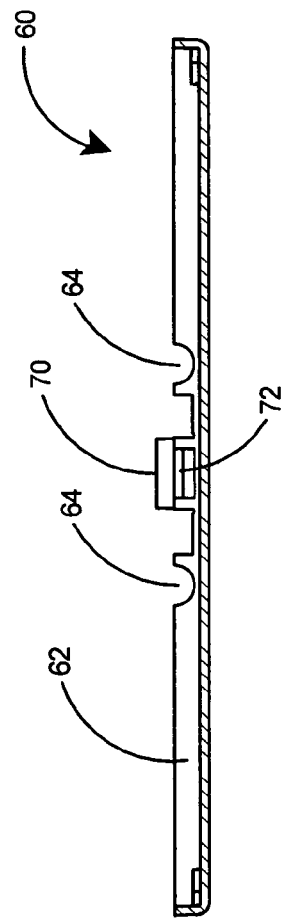
Fig. 15
Fig. 13
Fig. 14

ELECTRICAL BOX AND ADAPTER ASSEMBLY FOR BRICK WALL INSTALLATION

FIELD OF THE INVENTION

This invention relates to electrical junction boxes and specifically to an electrical box assembly that can be easily secured to the exterior brick wall of a building for accommodating and protecting a duplex outlet or other electrical device therein.

BACKGROUND OF THE INVENTION

Electrical outlet boxes are commonly installed on the exterior walls of buildings to provide outdoor electrical service. To accommodate the outlet box, an appropriately sized hole is made in the wall. Making an appropriately sized hole is typically easy to do in exterior walls that are constructed of wood siding, vinyl siding, stucco, or other materials that can be easily cut. After making a hole in the siding and the substrate, wall studs are typically exposed and offer a convenient support to which a conventional outlet box can be secured with mounting fasteners such as nails or screws.

Difficulties arise when trying to install a conventional outlet box on a brick wall. As a result of the substantial thickness of brick walls, a conventional outlet box inserted in an opening in the brick wall typically does not extend beyond the back surface of the bricks. The sidewalls of the conventional electrical box, which typically include the mounting fasteners, are therefore not exposed to the walls studs and cannot be secured in the conventional manner.

As wall studs are not an option for the installation of electrical boxes in brick walls, conventional outlet boxes are typically secured within the brick wall by installing mortar between the sidewalls of the box and the surrounding brick. One problem that arises when securing a conventional outlet box in this manner is that the installation is not aesthetically pleasing. After the installation is complete, the mortar is typically visible around the periphery of the conventional outlet box, thereby detracting from the attractiveness of the installed box.

A further problem arises as the result of the smooth outer sidewalls of the conventional outlet box as there is no structure on the outer surface of the sidewalls for holding the outlet box fast within the mortar.

Another problem arises with conventional flanged outlet boxes. A flange typically extends around the outer periphery of the sidewall at the front edge of the outlet box. Unfortunately the flange interferes with the mortaring operation and makes it difficult to mortar around the box. Additionally, the flange can easily be contaminated with mortar, which, once dried, cannot be easily removed from the flange and therefore detracting from the attractiveness of the conventional outlet box.

What is needed therefore is an electrical box that can be easily installed in an exterior brick wall, is adapted to provide solid anchoring in the wall, eliminates the possibility of mortar contamination on the exterior of the box, and provides an aesthetically pleasing exterior electrical box.

SUMMARY OF THE INVENTION

The invention is an electrical box assembly for providing electrical service on a brick wall. The assembly includes an electrical outlet box and an adapter. The adapter includes sidewalls defining an internal cavity, an open front, an open rear, and arcuate cable holders for temporarily holding electrical cables until they are routed into the outlet box. Outward extending tabs are provided on the sidewalls of the adapter for enabling secure anchoring of the adapter into a hole in a brick wall. The outlet box includes sidewalls, a hinged cover, and bosses for accepting an electrical device. A fastening arrangement is provided for securing the outlet box to the adapter. Electrical service is provided by mortaring the adapter into a hole in the wall, sliding the outlet box slid into the cavity of the adapter, and securing the outlet box to the adapter with the fastening arrangement.

OBJECTS AND ADVANTAGES

Several advantages are achieved with the electrical box assembly of the present invention, including:
 (1) The electrical box assembly of the present invention simplifies the installation of electrical devices on brick walls.
 (2) The adapter portion of the electrical box assembly includes mortar anchoring tabs that improve anchoring within the wall.
 (3) The use of an adapter to house the outlet box eliminates the possibility of mortar contamination on the exterior of the box.
 (4) The electrical box assembly allows easy removal of the outlet box when necessary without requiring removal of portions of the brick or mortar.
 (5) The outlet box and adapter of the present invention provides an aesthetically pleasing electrical box for the exterior of a building.

These and other objects and advantages of the present invention will be better understood by reading the following description along with reference to the drawings.

DESCRIPTION OF THE DRAWINGS

FIG. 13 is a front view of the cover member of FIG. 12.

FIG. 14 is a sectional view of the cover member taken along line 14-14 of FIG. 12.

FIG. 15 is a bottom view of the cover member taken along line 15-15 of FIG. 12.

TABLE OF NOMENCLATURE

Figure 1:
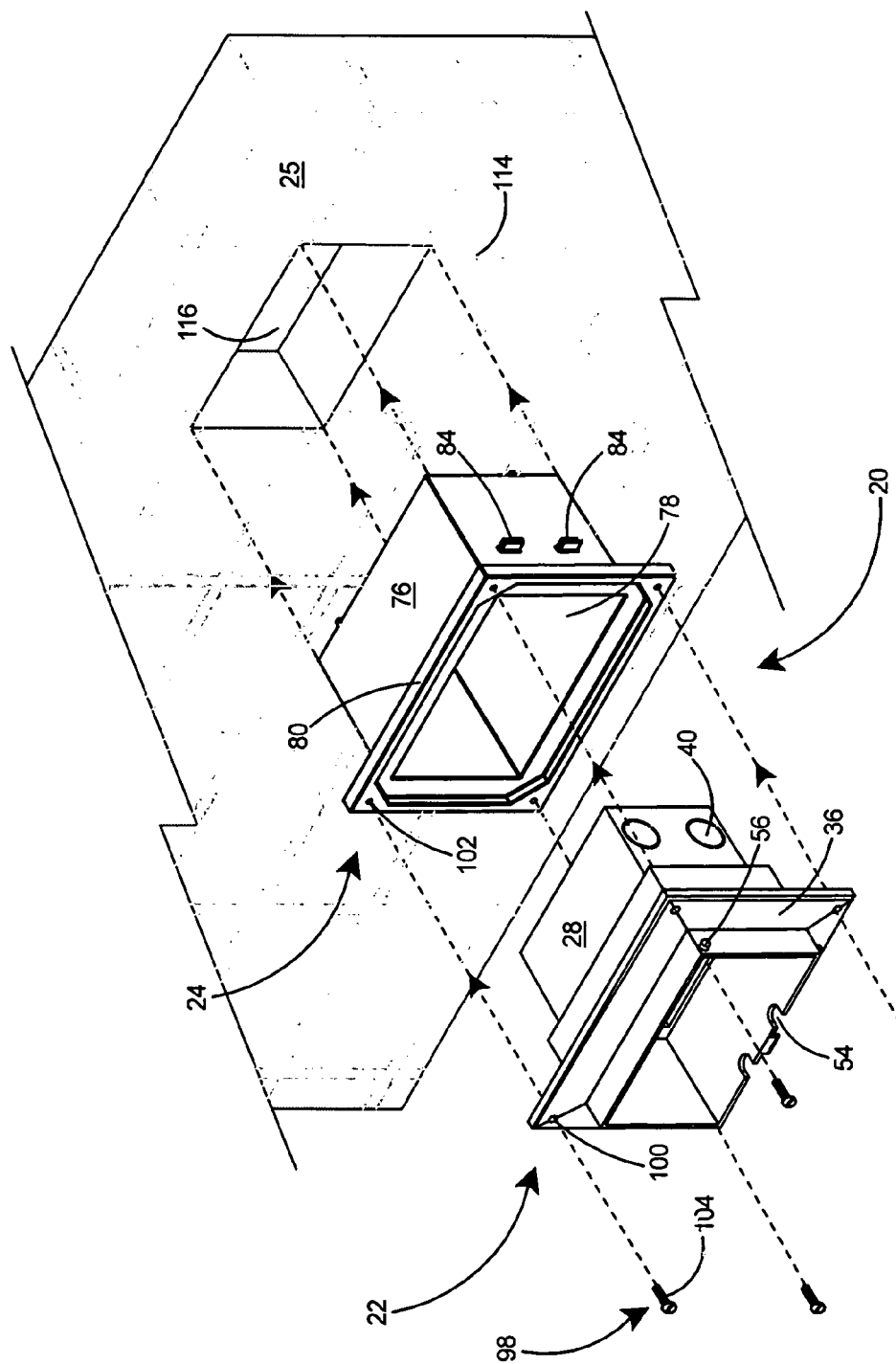
FIG. 1 is a perspective view of a preferred embodiment of an electrical box assembly according to the present invention exploded away from and in alignment to be inserted in a hole in a brick wall.

The following is a listing of part numbers used in the drawings along with a brief description:

| Part Number | Description |
| --- | --- |
| 20 | electrical box assembly |
| 22 | outlet box |
| 24 | adapter |
| 25 | brick wall |
| 26 | back wall of outlet box |
| 28 | sidewalls of outlet box |
| 30 | outer surface of outlet box sidewalls |
| 31 | front edge of outlet box |
| 32 | open front of outlet box |
| 34 | enclosure of outlet box |
| 36 | flange of outlet box |
| 38 | boss |
| 40 | removable knockout |
| 42 | front sidewall portion |
| 44 | rear sidewall portion |
| 46 | first enclosure |
| 48 | second enclosure |
| 50 | peripheral lip |
| 52 | front face of boss |
| 54 | U-shaped opening in outlet box |
| 56 | post |
| 58 | lip |
| 60 | cover member |
| 62 | peripheral sidewall of cover member |
| 64 | U-shaped opening in cover |
| 66 | ear |
| 68 | aperture in ear |
| 70 | latch member |
| 72 | opening in latch member |
| 74 | circular cord opening |
| 76 | sidewalls of adapter |
| 78 | inner cavity of adapter |
| 80 | flange of adapter |
| 81 | rear surface of flange |
| 82 | outer surface of sidewalls |
| 84 | mortar anchoring tab |
| 86 | front edge of adapter |
| 88 | inner surface of adapter sidewalls |
| 90 | rear edge of adapter sidewalls |
| 92 | corner |
| 94 | arcuate cable holder |
| 96 | recessed area |
| 98 | fastening arrangement |
| 100 | aperture |
| 102 | bore |
| 104 | fastener |
| 106 | electrical device |
| 108 | fastener for electrical device |
| 110 | bore in boss |
| 112 | sealing material |
| 113 | faceplate |
| 114 | mortar |
| 116 | hole in wall |
| D1 | distance tabs extend from sidewall of adapter |
| D2 | distance of tabs from rear surface of flange |
| T1 | thickness of mortar anchoring tabs |

DETAILED DESCRIPTION OF THE INVENTION

The present invention is an electrical box assembly including an outlet box and a mounting device for providing electrical service on a brick wall.

With reference to FIG. 1, the electrical box assembly 20 includes an outlet box 22 and an adapter 24 that serves as the mounting device. As shown in FIG. 1, the electrical box assembly 20 is used to provide electrical service on a brick wall 25.

Figure 10:
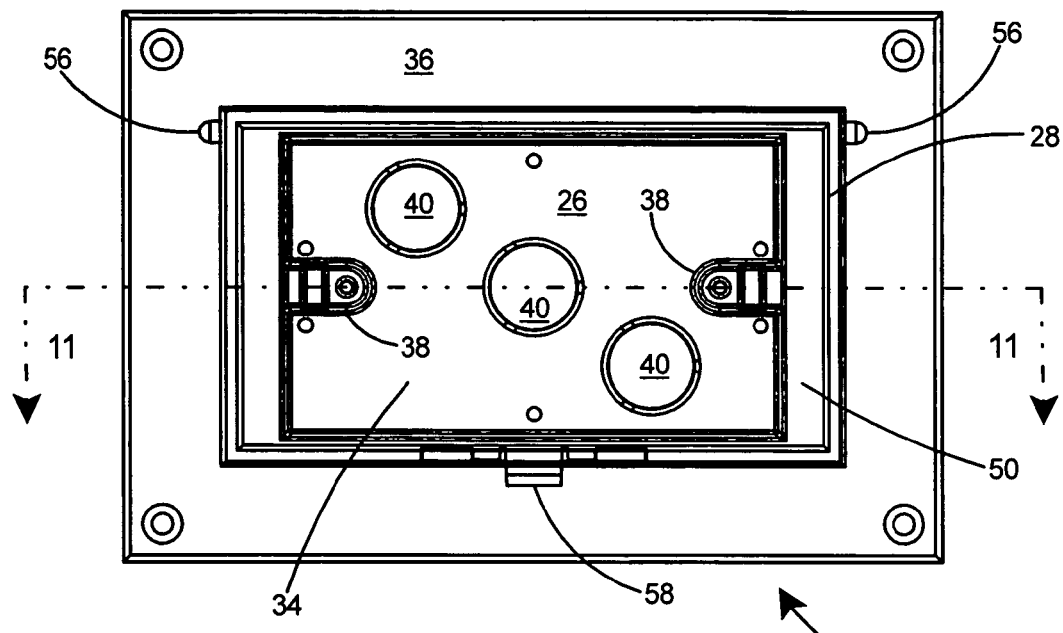
FIG. 10 is a front view of the outlet box portion of the electrical box assembly of the present invention.
Figure 11:
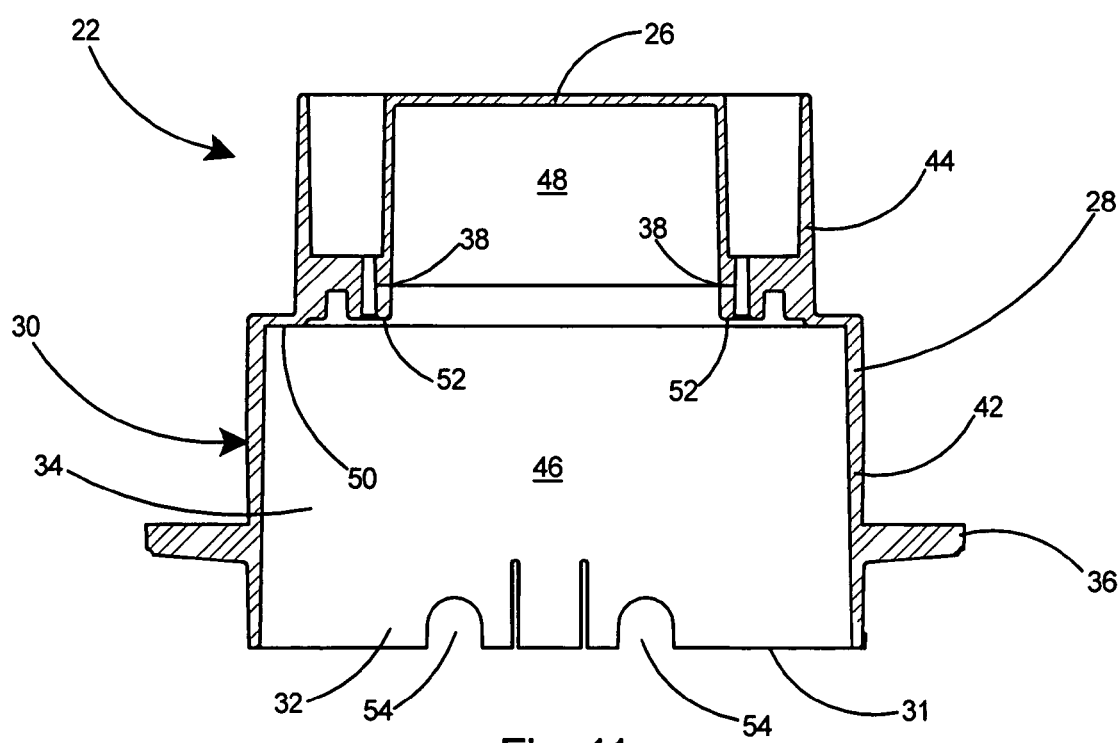
FIG. 11 is a sectional view of the outlet box taken along line 11-11 of FIG. 10.

Referring to FIGS. 10 and 11, the outlet box 22 includes a back wall 26, sidewalls 28 having an outer surface 30 and a front edge 31, and an open front 32 defining an enclosure therein 34. A flange 36 extends from the sidewalls 28 of the outlet box 22. Bosses 38 are included within the enclosure 34 of the outlet box 22. The back wall 26 of the outlet box 22 includes one or more removable knockout areas 40 therein.

With reference to FIG. 11, the sidewalls 28 of the outlet box 22 include a front sidewall portion 42 adjacent the flange 36 and a rear sidewall portion 44 extending backward from the front sidewall portion 42. The front sidewall portion 42 is of a greater dimension that the rear sidewall portion 44 thereby dividing the enclosure 34 into a first enclosure 46 and a second enclosure 48. The outlet box 22 includes a peripheral lip 50 at the juncture of the first enclosure 46 and second enclosure 48. The bosses 38 of the outlet box 22 include front faces 52 that are at substantially the same depth as the peripheral lip 50 within the outlet box 22. When an electrical device (not shown) is later secured to the bosses 38, the depth of the bosses 38 within the outlet box 22 will recess the electrical device a substantial distance behind the front edge 31 of the box 22. The front edge 31 of the outlet box 22 includes U-shaped openings 54 therein. The front sidewall portion 42 includes integral posts 56 and a lip 58 extending therefrom. The outlet box 22 of the present invention is preferably molded in one piece of plastic and the bosses 38 are preferably molded integrally with the one-piece outlet box 22.

With reference to FIGS. 13-15, there is shown a cover member 60 that forms a portion of the electrical box assembly of the present invention. The cover member 60 includes a peripheral sidewall 62, U-shaped cord openings 64 in the peripheral sidewall 62, ears 66 extending from the sidewall 62, and apertures 68 in the ears 66. A latch member 70 including an opening 72 therein extends downward from the peripheral sidewall 62.

Figure 9:
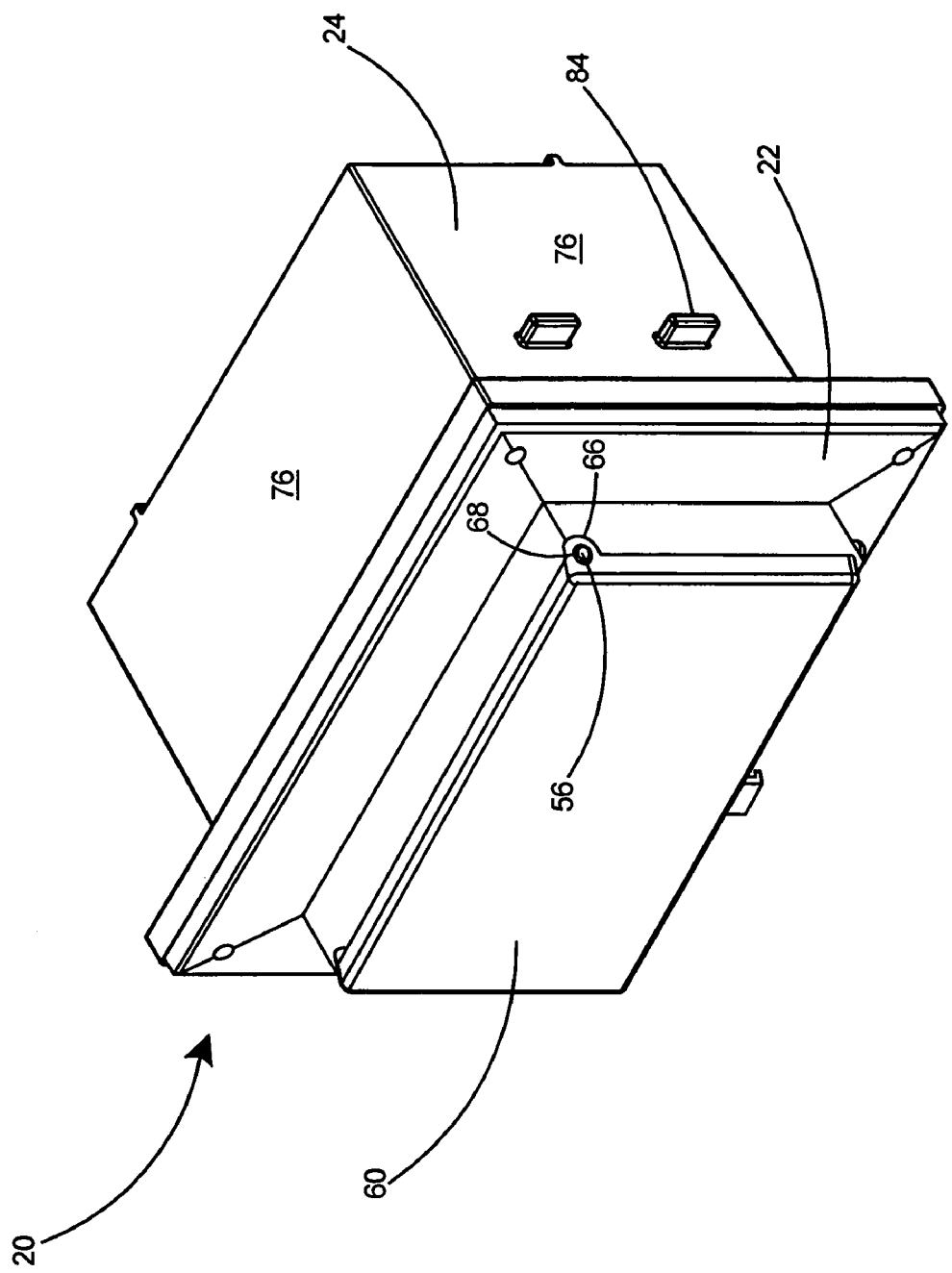
FIG. 9 is a perspective view of the installed electrical box assembly of the present invention including an in-use cover on the front of the outlet box.

As shown in FIG. 9, the cover member 60 is hinged to the outlet box 22 by the posts 56 extending through the apertures 68 in the ears 66 of the cover member 60. The cover member 60 is preferably molded of plastic in one piece and therefore the resilient ears 66 can be biased outwards and then slipped over the posts 56 of the outlet box 22 thereby snapping the ears 66 of the cover member 60 over the posts 56 of the outlet box 22 and rendering it rotatably secured thereto. The cover member 60 is depicted in FIG. 9 in a closed position upon the front of the outlet box 22. The cover member 60 is therefore rotatably secured to the outlet box 22 for selectively closing or opening the open front of the outlet box 22.

Figure 12:
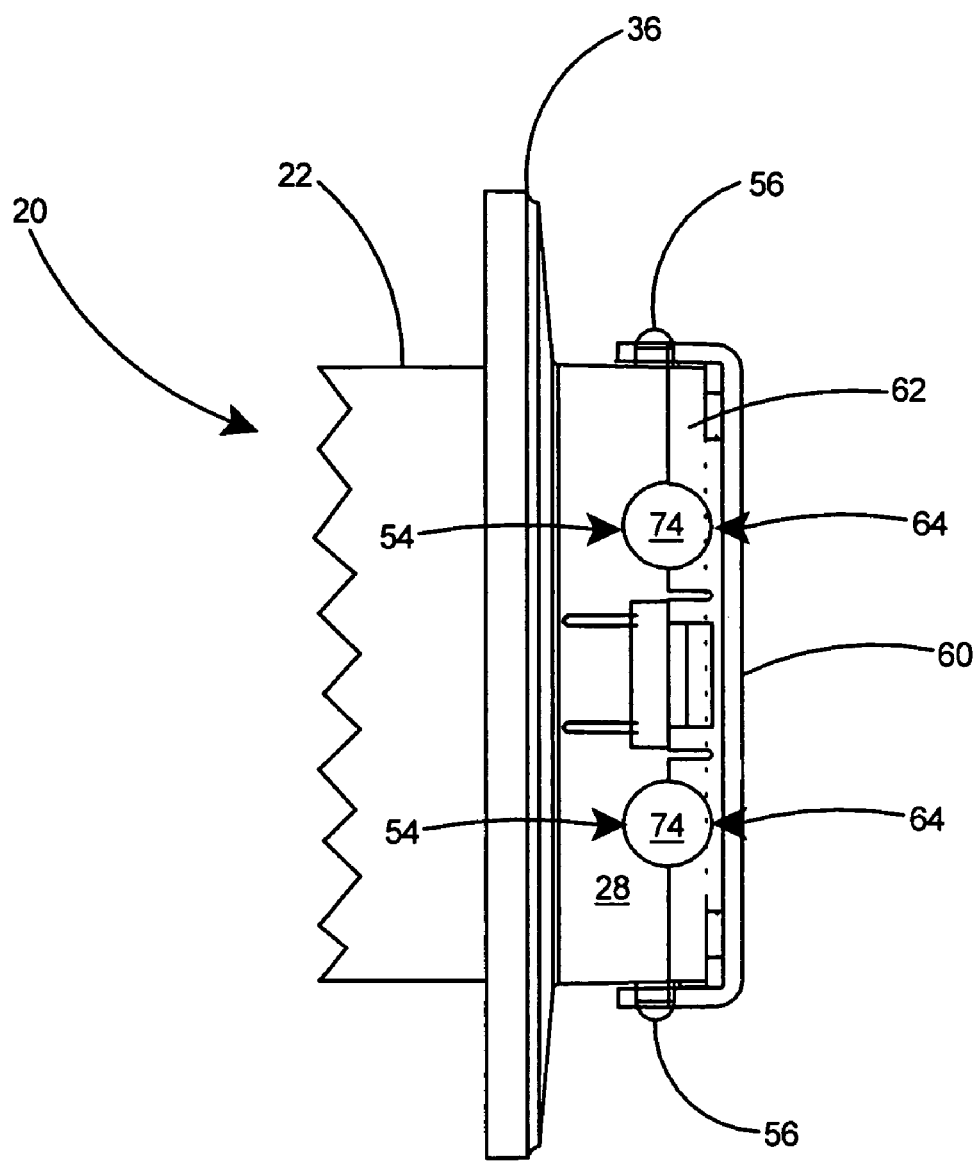
FIG. 12 is a perspective view of a cover member used with the electrical box of the present invention.

Referring to FIG. 12, when the cover 60 is closed upon the outlet box 22, a substantially circular cord opening 74 is formed by the peripheral sidewall 62 of the cover member 60 and the sidewalls 28 of the outlet box 22.

Figure 2:
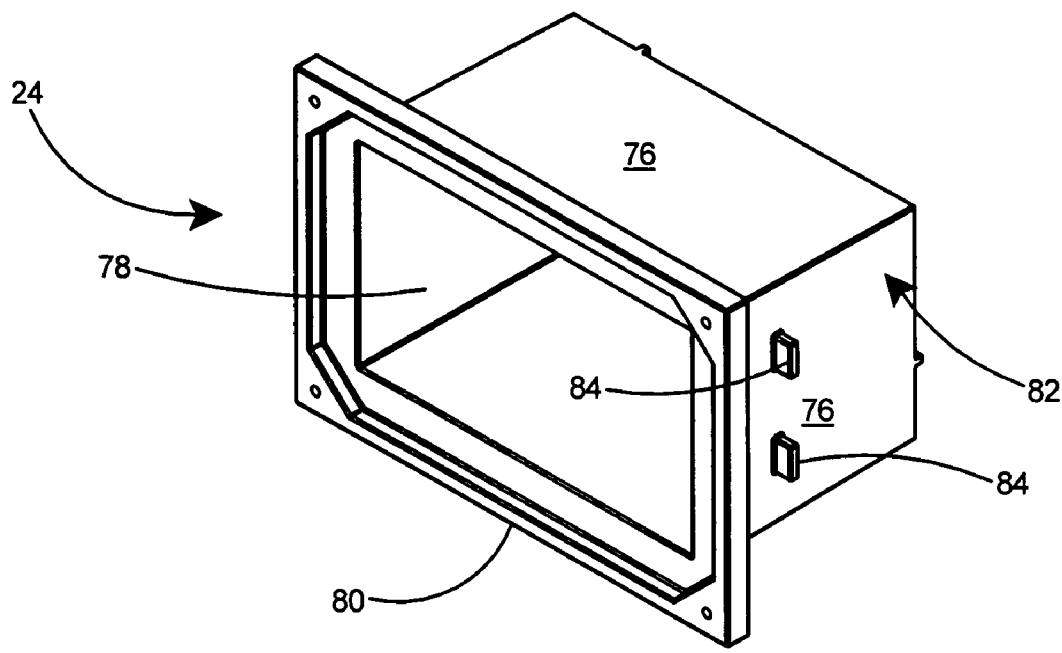
FIG. 2 is a front perspective view of the adapter portion of the electrical box assembly of FIG. 1.
Figure 3:
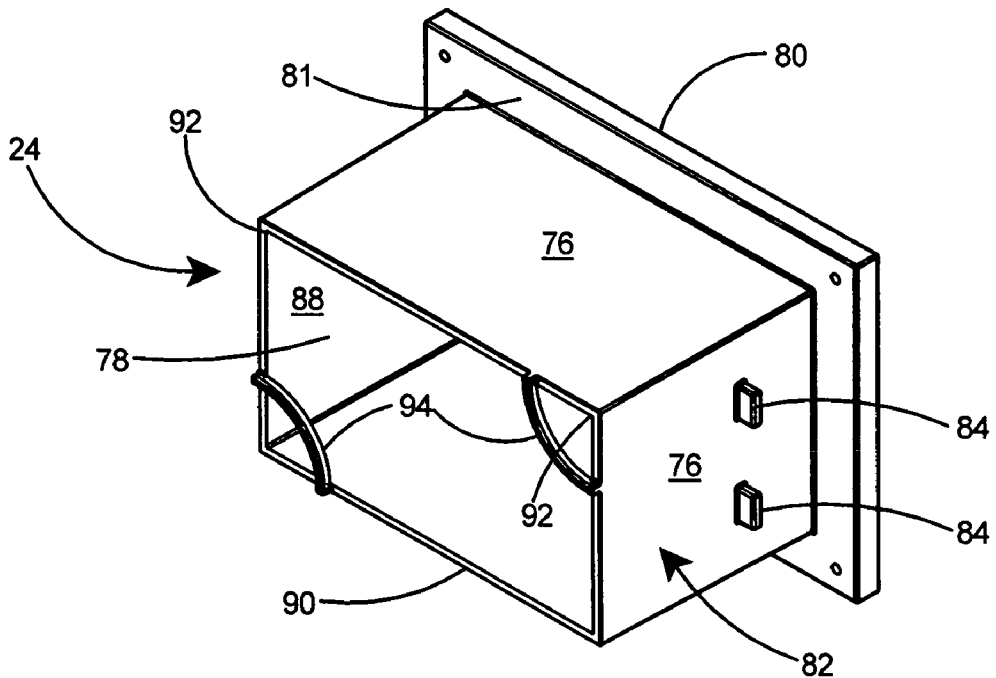
FIG. 3 is a rear perspective view of the adapter of FIG. 2.
Figure 4:
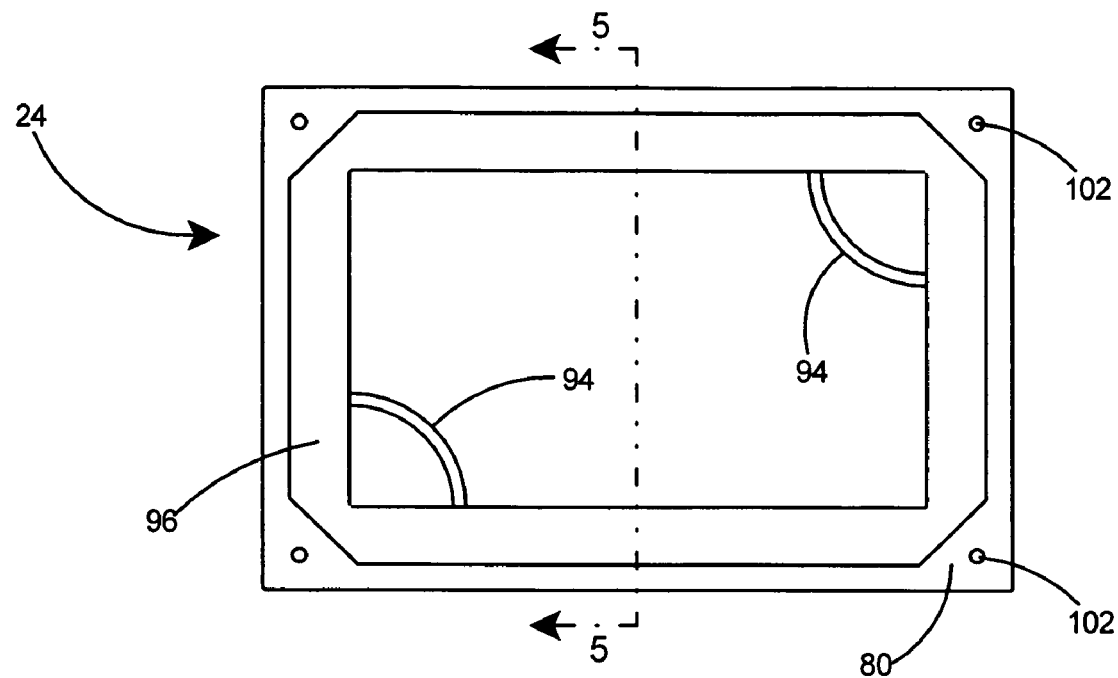
FIG. 4 is a front view of the adapter of FIG. 2.

With reference to FIGS. 2 and 3, the adapter 24 includes sidewalls 76, an inner cavity 78, and a flange 80 extending from the sidewalls 76. The flange 80 includes a rear surface 81. The sidewalls 76 of the adapter 24 include an outer surface 82 and mortar anchoring tabs 84 extending from the outer surface 82. As the mortar anchoring tabs 84 will be used to secure the adapter 24 within a hole in a brick wall (not shown), it is critical that the tabs 84 have sufficient rigidity and strength to hold the adapter securely within the mortar once it has dried. As the adapter is preferably molded in one-piece of plastic, the tabs 84 must have sufficient thickness to withstand any force applied to the adapter after it is secured within the wall. Furthermore, the length of the tabs 84 must be sufficient to extend well into the mortar surrounding the adapter but not so far as to interfere with the adjacent bricks.

Figure 6:
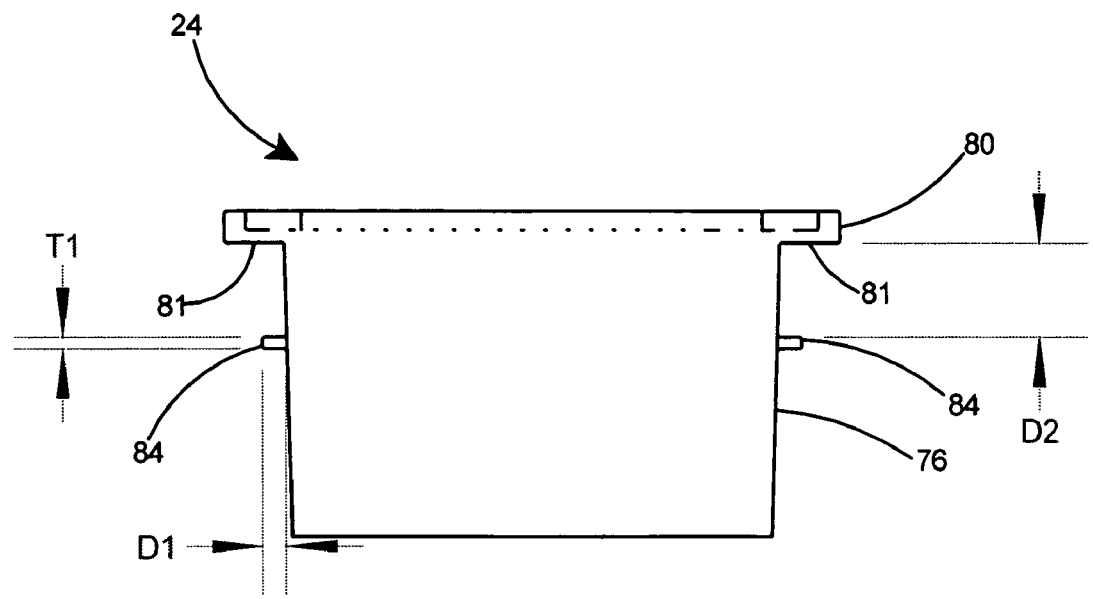
FIG. 6 is a side view of the adapter of FIG. 4.
Figure 7:
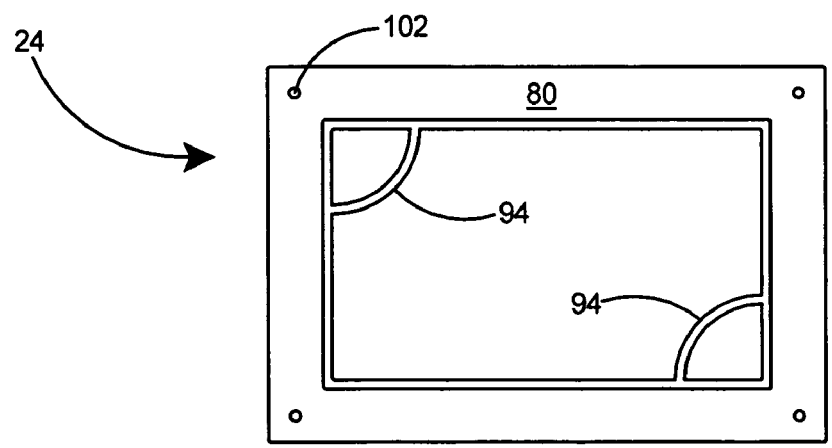
FIG. 7 is a back view of the adapter of FIG. 4.

With reference to FIG. 6, the mortar anchoring tabs 84 therefore preferably extend a distance D1 from the sidewalls 76 of between 0.2 and 0.4 inch. To provide proper anchoring within the mortar, it is critical that the tabs 84 be located sufficiently behind the rear surface 81 of the flange 80. The mortar anchoring tabs 84 are preferably positioned at a distance D2 of between 0.75 and 2.0 inches from the rear surface 81 of the flange 80. To provide the proper rigidity and stiffness, the mortar anchoring tabs 84 preferably have a thickness T1 of at least 0.07 inch.

Referring to FIG. 3, the sidewalls 76 of the adapter include an inner surface 88, a rear edge 90, and four corners 92 at the juncture of the sidewalls 76 at the rear edge 90. One or more arcuate cable holders 94 are provided at the corners 92 bridging between two of the adjacent sidewalls 76 at the corners 92.

Figure 5:
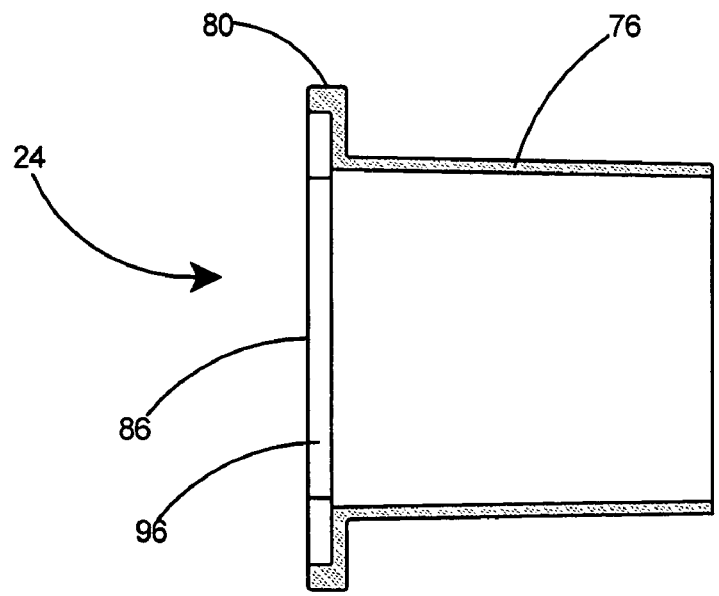
FIG. 5 is a sectional view of the adapter taken along line 5-5 of FIG. 4.

As shown in FIG. 5, the adapter 24 includes a front edge 86 and the flange 80 of the adapter 24 extends outward from the sidewalls 76 and forward from the front edge 86. A recessed area 96 is provided at the front edge 86 of the adapter 24 formed by the forward and outward extending flange 80.

Figure 8:
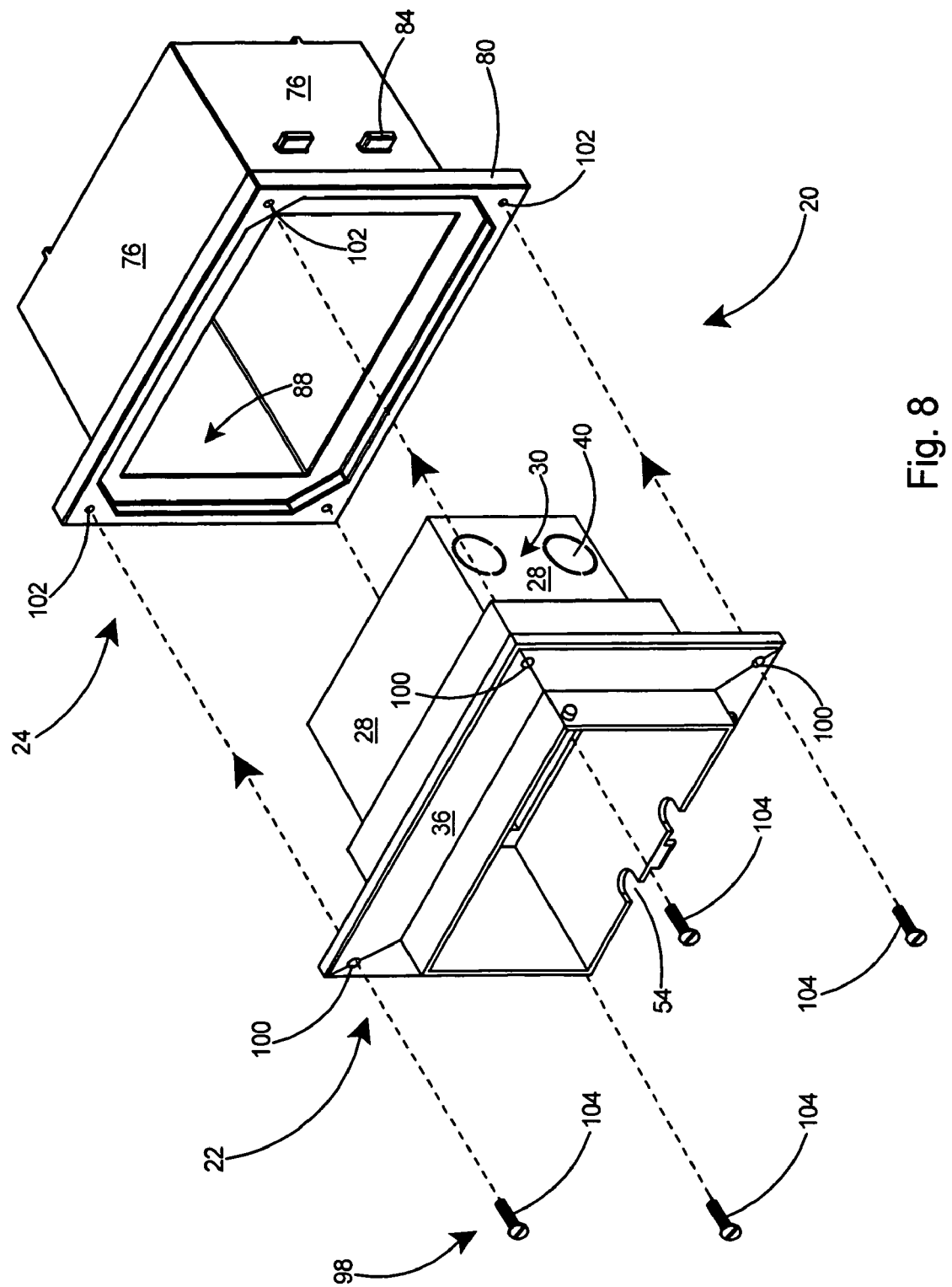
FIG. 8 is a perspective view of the electrical box assembly of the present invention including the outlet box and adapter.

With reference to FIG. 8, the electrical box assembly 20 includes a fastening arrangement 98 for securing the outlet box 22 to the adapter 24. The fastening arrangement 98 includes apertures 100 in the flange 36 of the outlet box 22, bores 102 in the flange 80 of the adapter 24, and fasteners 104 for threading through the apertures 100 in the flange 36 of the outlet box 22 and into the bores 102 in the flange 80 of the adapter 24. The sidewalls 28 of the outlet box 22 are telescopically received or nest within the sidewalls 76 of the adapter 24. Preferably, to enable the outlet box 22 to nest within the adapter 24, the dimension in each direction, both vertically and horizontally, across the inner surface of the sidewalls 76 of the adapter 24 are between 0.06 and 0.25 inch larger than the dimension across the outer surface 30 of the outlet box sidewalls 28.

Figure 17:
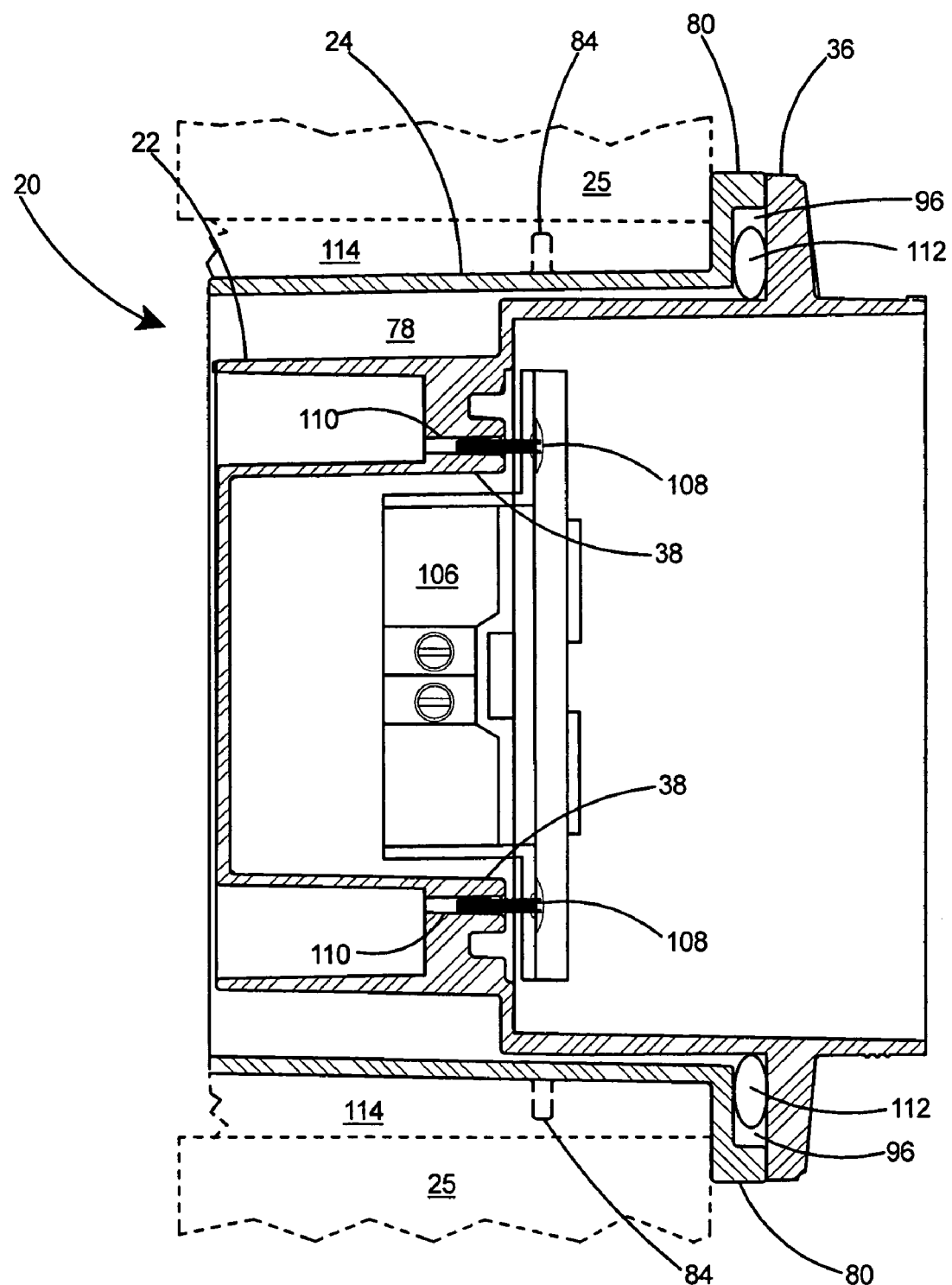
FIG. 17 is a sectional view of the outlet box and adapter portions of the electrical box assembly secured within a brick wall.

Referring to FIG. 17, an electrical device 106 can be secured to the bosses 38 in the outlet box 22 by fasteners 108 as shown. The bosses 38 include bores 110 that are capable of accepting the fasteners 108 from the electrical device 106. The recessed area 96 of the electrical box assembly 20 is capable of accepting duct seal or similar material therein for sealing the outlet box to the adapter. A bead of sealing material 112, such as duct seal or caulk, may then be applied to the front edge 31 of the outlet box 22. The sealant material 112 substantially fills the recessed area 96 and creates a rain-tight seal between the outlet box 22 and the adapter 24. After the electrical device 106 is secured to the outlet box 22, a conventional faceplate 113 is secured to the electrical device 106.

With reference to FIG. 17, the electrical box assembly 20 of the present invention is operated by sliding the adapter 24 into a hole in a brick wall 25 until the flange 80 of the adapter 24 is flush against the brick wall 25, filling the hole surrounding the adapter 24 with mortar 114, sliding the outlet box 22 into the inner cavity 78 of the adapter 24 until the flange 36 of the outlet box 22 is flush against the flange 80 of the adapter 24, and securing the outlet box 22 to the adapter 24 with the fastening arrangement 98.

Referring to FIG. 12, when the cover 60 is closed upon the outlet box 22, a substantially circular opening 74 is formed by the peripheral sidewall 62 of the cover member 60 and the sidewalls 28 of the outlet box 22. When the cover member 60 is pivotally connected to and closed upon the box 22 the U-shaped openings 54 of the box 22 mate with the U-shaped openings 64 of the cover member 60 thereby providing a substantially circular opening 74 therein. The circular openings 74 thereby form a passageway for electrical cords (not shown). When the electrical box assembly 20 of the present invention is mounted on a brick wall with the cord openings 74 oriented downward vertically, the electrical box assembly 20 creates a rainproof electrical box that effectively shields the electrical device therein from rainfall.

The several advantages conferred by the electrical box assembly 20 of the present invention are summarized by reference to FIG. 1. The electrical box assembly 20 of the present invention advantageously simplifies the installation of an electrical device on a brick wall 25. The adapter portion 24 of the electrical box assembly 20 includes mortar anchoring tabs 84 that improve anchoring to mortar 114 within the brick wall 25. The use of an adapter 24 to house the outlet box 22 eliminates the possibility of mortar contamination on the exterior of the outlet box 22 or the outlet box flange 36 as the outlet box 22 is not placed in contact with the adapter 24 until it is firmly mortared in place and the mortar has cured. The electrical box assembly 20 further provides the advantage that the outlet box 22 can be easily removed when necessary by simply undoing the fastening arrangement 98 between the adapter 24 and outlet box 22. As a result of the electrical box assembly 20 including an adapter 24, which is held by the mortar 114, the outlet box 22 is kept free of mortar contamination and the assembly 20 therefore provides a more aesthetically pleasing electrical box for the exterior of a building.

As shown in FIG. 1, the electrical box assembly 20 of the present invention simplifies the preparation of a brick wall 25 for accepting an electrical box 22. In new construction, the masons create a hole 116 in the brick wall 25 by simply omitting a brick. The masons simply mortar the adapter 24 into the resulting hole 116 and, after the mortar has set, an electrician completes the installation of the electrical box assembly 20 by securing the outlet box 22 to the adapter 24 with the fastening arrangement 98. If the electrical box assembly 20 is installed on an existing wall, the installer must cut a hole 116 with chisels or other conventional means.

Figure 16:
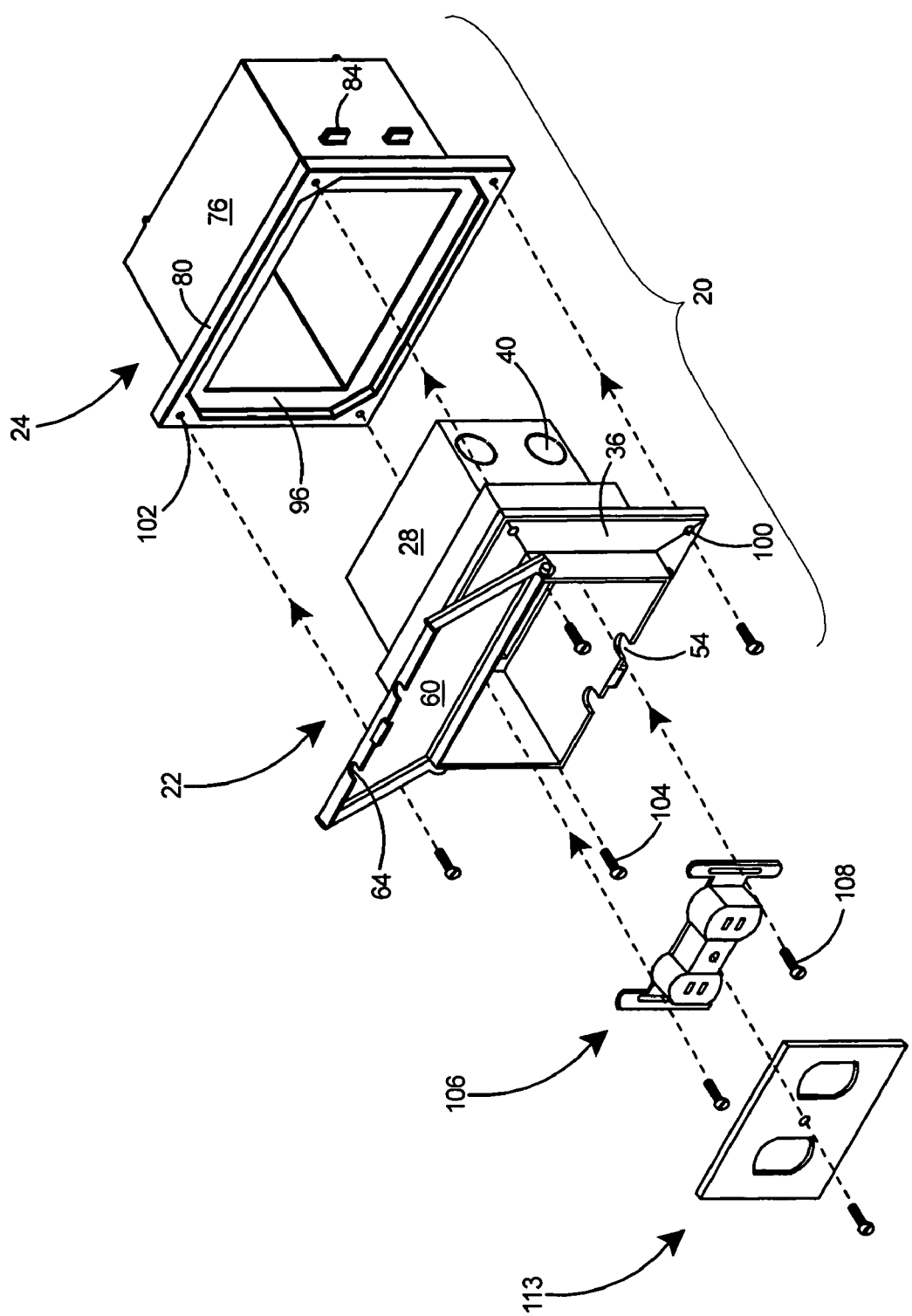
FIG. 16 is a perspective view of the electrical box assembly of the present invention including the outlet box and adapter and an electrical device and faceplate in alignment to be secured thereto.

Referring to FIG. 16, after the adapter 24 is secured in the wall (not shown) and the outlet box 22 is secured to the adapter 24, an electrical device 106 is installed with fasteners 108 into the outlet box 22 and a faceplate 113 is secured to the electrical device 106. The cover member 60 can be rotated to the open or closed position as desired to provide a while-in-use cover for rain-proofing the electrical box assembly 20. With the cover 60 in the closed position, the U-shaped openings 64 in the cover align with the U-shaped openings in the outlet box 22 and thereby provide circular cord openings 74 (see FIG. 12) through which electrical cords (not shown) can be passed.

Having thus described the invention with reference to a preferred embodiment, it is to be understood that the invention is not so limited by the description herein but is defined as follows by the appended claims.

What is claimed is:

1. An electrical box assembly comprising:
   an outlet box including a back wall, sidewalls, and an open front defining an enclosure therein;
   a flange extending from said sidewalls of said outlet box;
   an adapter including sidewalls and an inner cavity;

said sidewalls of said outlet box capable of nesting within said sidewalls of said adapter;
a fastening arrangement for securing said outlet box to said adapter;
a cover rotatably secured to said outlet box for selectively closing or opening said open front of said outlet box
said sidewalks of said adapter include a rear edge;
a corner at a juncture of said sidewalls of said adapter at said rear edge; and
an arcuate cable holder bridging between two of said sidewalls of said corner.

2. The assembly of claim 1 including
an outer surface on said sidewalls of said adapter; and
mortar anchoring tabs extending from said outer surface of said sidewalls of said adapter.

3. The assembly of claim 2 wherein
a flange extends from said sidewalls of said adapter;
said flange of said adapter includes a rear surface;
said mortar anchoring tabs extend a distance from said sidewalls of between 0.2 and 0.4 inch; and
said mortar anchoring tabs extend a distance of between 0.75 and 2.0 inches from said rear surface of said flange.

4. The assembly of claim 2 wherein said mortar anchoring tabs include a thickness of at least 0.07 inch.

5. The assembly of claim 1 wherein said sidewalls of said outlet box are telescopically received within said sidewalls of said adapter.

6. The assembly of claim 1 wherein
said sidewalls of said adapter include an inner surface;
said sidewalls of said outlet box include an outer surface; and
the dimension across said inner surface of said sidewalls of said adapter are between 0.06 and 0.25 inch larger than the dimension across said outer surface of said outlet box.

7. The assembly of claim 1 including
a flange extending from said sidewalls of said adapter;
a front edge on said adapter, said flange of said adapter extending outward from said sidewalls and forward from said front edge; and
a recessed area at said front edge of said adapter formed by said forward extending flange.

8. The assembly of claim 7 wherein said recessed area is capable of accepting caulking or similar material therein for sealing said outlet box to said adapter.

9. The assembly of claim 1 wherein
said outlet box includes bosses within said enclosure; and
said bosses capable of accepting fasteners from an electrical device for securing it therein.

10. The assembly of claim 9 wherein
said outlet box is molded in one piece of plastic; and
said adapter is molded in one piece of plastic.

11. The assembly of claim 10 wherein said bosses are molded integrally with said one piece outlet box.

12. The assembly of claim 1 wherein said back wall of said outlet box includes one or more removable knockout areas therein.

13. The assembly of claim 1 wherein
said sidewalls of said outlet box include a front edge; and
U-shaped cord openings in said front edge of said sidewalls.

14. The assembly of claim 13 wherein
said cover member includes a peripheral sidewall;
U-shaped cord openings in said peripheral sidewall of said cover member; and
said cover member in a closed position upon said front edge of said outlet box creates a substantially circular cord opening in said sidewalls of said cover member and said sidewalls of said outlet box.

15. An electrical box assembly comprising:
an outlet box including a back wall, sidewalls, and an open front defining an enclosure therein;
a flange extending from said sidewalls of said outlet box;
an adapter including sidewalls and an inner cavity;
a flange extending from said sidewalls of said adapter;
said sidewalls of said outlet box capable of nesting within said sidewalls of said adapter;
a fastening arrangement for securing said outlet box to said adapter;
a cover rotatably secured to said outlet box for selectively closing or opening said open front of said outlet box;
wherein said fastening arrangement comprises apertures in said flange of said outlet box;
bores in said flange of said adapter; and
fasteners for threading through said apertures in said flange of said outlet box and into said apertures of said flange of said adapter.

16. An electrical box assembly comprising:
an outlet box including a back wall, sidewalls, a front edge and an open front defining an enclosure therein;
a flange extending from said sidewalls of said outlet box;
an adapter including sidewalks and an inner cavity;
said sidewalls of said outlet box capable of nesting within said sidewalls of said adapter;
a fastening arrangement for securing said outlet box to said adapter;
a cover rotatably secured to said outlet box for selectively closing or opening said open front of said outlet box;
said sidewalls of said outlet box include a front sidewall portion adjacent said flange of said outlet box;
a rear sidewall portion extending backward from said front sidewall portion;
said front sidewall portion is of a greater dimension than said rear sidewall portion thereby dividing said enclosure into a first enclosure and a second enclosure;
a peripheral lip at the juncture of said first and second enclosures;
bosses for mounting an electrical device, said bosses including front faces that are at substantially the same depth as said peripheral lip within said outlet box wherein said depth of said bosses recess the electrical device a substantial distance behind said front edge of said outlet box.

17. An electrical box assembly comprising:
an outlet box including a back wall, sidewalls having a rear edge, and an open front defining an enclosure therein;
a flange extending from said sidewalls of said outlet box;
an adapter including sidewalls and tabs extending outward from said sidewalls;
a flange extending from said sidewalls of said adapter;
said sidewalls of said outlet box capable of nesting within said sidewalls of said adapter;
a fastening arrangement for securing said outlet box to said adapter; and
an arcuate cable holder bridging between two of said sidewalls of said outlet box at said rear edge.

18. A method of installing an electrical box on a brick wall including:
a) providing an electrical box assembly including an outlet box including a back wall, sidewalls of a first dimension, and an open front defining an enclosure therein, a flange extending from said sidewalls of said outlet box, an adapter including sidewalls of a second dimension and an inner cavity, tabs extending outwards from said sidewalls of said adapter, a flange extending from said sidewalls of said adapter, a fastening arrangement for securing said outlet box to said adapter, and a cover rotatably attached to said outlet box for selectively closing or opening said open front of said outlet box;

b) providing a hole in the brick wall, the hole capable of accommodating the sidewalls of said adapter;

c) sliding said adapter into the hole in the brick wall until said flange of said adapter is flush against the brick wall;

d) filling the hole surround said adapter with mortar;

e) sliding said outlet box into said inner cavity of said adapter until said flange of said outlet box is flush against said flange of said adapter; and f) securing said outlet box to said adapter with said fastening arrangement.

* * * * *